US012181117B2

(12) United States Patent
Gromfeld

(10) Patent No.: US 12,181,117 B2
(45) Date of Patent: Dec. 31, 2024

(54) LIGHT MODULE FOR A LIGHTING DEVICE OF A MOTOR VEHICLE

(71) Applicant: VALEO VISION, Bobigny (FR)

(72) Inventor: Yves Gromfeld, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 18/257,395

(22) PCT Filed: Dec. 16, 2021

(86) PCT No.: PCT/EP2021/086322
§ 371 (c)(1),
(2) Date: Jun. 14, 2023

(87) PCT Pub. No.: WO2022/129422
PCT Pub. Date: Jun. 23, 2022

(65) Prior Publication Data

US 2024/0019098 A1 Jan. 18, 2024

(30) Foreign Application Priority Data

Dec. 18, 2020 (FR) ....................................... 2013629

(51) Int. Cl.
*F21S 41/33* (2018.01)
*F21S 41/147* (2018.01)
(Continued)

(52) U.S. Cl.
CPC ........... *F21S 41/265* (2018.01); *F21S 41/151* (2018.01); *F21S 41/336* (2018.01); *F21S 41/43* (2018.01);
(Continued)

(58) Field of Classification Search
CPC ........ F21S 41/265; F21S 41/27; F21S 41/275; F21S 41/285; F21S 41/29; F21S 41/295;
(Continued)

(56) References Cited

U.S. PATENT DOCUMENTS 8,201,981 B2 6/2012 Brendle et al.
9,157,597 B2 10/2015 Gurtl et al.
(Continued)

FOREIGN PATENT DOCUMENTS

CN 112097215 A * 12/2020 ............ F21S 41/141
DE 102017118139 A1 * 2/2019 ............ F21S 41/153
(Continued)

OTHER PUBLICATIONS

Machine translation of EP 2587125 A2 retrieved from the FIT database of PE2E search. (Year: 2023).*
(Continued)

*Primary Examiner* — Colin J Cattanach
(74) *Attorney, Agent, or Firm* — Valeo Vision

(57) ABSTRACT

A light module for a lighting device of a motor vehicle, including a plurality of first light sources, at least a first collector having a reflective surface arranged to collect and reflect the light rays emitted by the light sources into a light beam, an optical projection system arranged to project the light beam, and a first diffusing screen disposed between a first portion of the optical projection system and the collector. The optical system including the first portion arranged to form an image of the reflective surface of the collector.

13 Claims, 5 Drawing Sheets

(51) Int. Cl.

| | |
|---|---|
| ***F21S 41/148*** | (2018.01) |
| ***F21S 41/151*** | (2018.01) |
| ***F21S 41/19*** | (2018.01) |
| ***F21S 41/20*** | (2018.01) |
| ***F21S 41/24*** | (2018.01) |
| ***F21S 41/26*** | (2018.01) |
| ***F21S 41/265*** | (2018.01) |
| ***F21S 41/27*** | (2018.01) |
| ***F21S 41/275*** | (2018.01) |
| ***F21S 41/29*** | (2018.01) |
| ***F21S 41/32*** | (2018.01) |
| ***F21S 41/36*** | (2018.01) |
| ***F21S 41/39*** | (2018.01) |
| ***F21S 41/43*** | (2018.01) |
| ***F21S 45/435*** | (2018.01) |

(52) U.S. Cl.

CPC ........... *F21S 45/435* (2018.01); *F21S 41/147* (2018.01); *F21S 41/148* (2018.01); *F21S 41/19* (2018.01); *F21S 41/192* (2018.01); *F21S 41/198* (2018.01); *F21S 41/20* (2018.01); *F21S 41/24* (2018.01); *F21S 41/26* (2018.01); *F21S 41/27* (2018.01); *F21S 41/275* (2018.01); *F21S 41/285* (2018.01); *F21S 41/29* (2018.01); *F21S 41/295* (2018.01); *F21S 41/322* (2018.01); *F21S 41/36* (2018.01); *F21S 41/39* (2018.01); *F21S 41/395* (2018.01)

(58) Field of Classification Search

CPC .......... F21S 41/322; F21S 41/36; F21S 41/39; F21S 41/395; F21S 41/147; F21S 41/148; F21S 41/151; F21S 41/19; F21S 41/198; F21S 41/192; F21S 41/26; F21S 41/20; F21S 41/24

See application file for complete search history.

(56) References Cited

U.S. PATENT DOCUMENTS

| | | | | |
|---|---|---|---|---|
| 10,851,958 | B2 | 12/2020 | Gromfeld | |
| 10,955,102 | B1 * | 3/2021 | Lee | F21S 41/151 |
| 11,022,266 | B2 | 6/2021 | Hermitte et al. | |
| 2014/0321147 | A1 * | 10/2014 | Todaka | F21S 41/336 362/245 |
| 2015/0085523 | A1 * | 3/2015 | Gurtl | F21S 41/322 362/607 |
| 2017/0023203 | A1 * | 1/2017 | Sagisaka | F21S 41/148 |
| 2018/0087737 | A1 * | 3/2018 | Hermitte | F21S 41/663 |
| 2018/0112853 | A1 * | 4/2018 | Son | F21S 45/47 |
| 2019/0299842 | A1 * | 10/2019 | Franc | F21S 41/143 |

FOREIGN PATENT DOCUMENTS

| | | | | |
|---|---|---|---|---|
| EP | 2587125 | A2 * | 5/2013 | F21S 41/143 |
| EP | 3130838 | A1 | 2/2017 | |
| EP | 3401591 | A1 | 11/2018 | |
| EP | 3521691 | A1 | 8/2019 | |
| EP | 3708904 | A1 | 2/2020 | |
| FR | 2942020 | A1 | 8/2010 | |
| FR | 3056698 | A1 * | 3/2018 | F21S 41/143 |
| WO | 2018132852 | A1 | 7/2018 | |

OTHER PUBLICATIONS

Machine translation of CN 112097215 A retrieved from the FIT database of PE2E search. (Year: 2023).*

Machine translation of DE 102017118139 A1 retrieved from the FIT database of PE2E search. (Year: 2023).*

Machine translation of FR 3056698 A1 retrieved from the FIT database of PE2E search. (Year: 2023).*

European Patent Office, International Search Report (with English translation) and Written Opinion of corresponding International Application No. PCT/EP2021/086322, dated Mar. 25, 2022.

* cited by examiner

LIGHT MODULE FOR A LIGHTING DEVICE OF A MOTOR VEHICLE

TECHNICAL FIELD

The invention relates to the field of lighting and light signaling, and more particularly to the field of motor vehicles.

The invention relates to the technical field of lighting and light signaling.

BACKGROUND OF THE INVENTION

In the field of motor-vehicle lighting, it is generally known to use light modules comprising a light source, a collector with a reflective surface and a lens-type optical system. This type of light module makes it possible to project an image of the collector onto the road. The projected image corresponds to a substantially rectangular quadrilateral shape. It is customary to use a plurality of collectors and a plurality of light sources whose light beams are all projected onto the same optical system. A plurality of images corresponding to the number of collectors used is projected on the road, in the form of a segmented light beam. This segmented light beam is generally combined with another light beam, on which it is superimposed.

However, this type of light module has a major drawback for motor-vehicle drivers integrating these said modules. Specifically, when one of the light sources is deactivated, for example to implement a lighting function of the non-dazzling type or of the dynamic cornering lighting type, the image of the corresponding collector is not projected onto the road. This results in a loss of luminosity, at the level of the superposition between this image and the other light beam. This loss of luminosity can be annoying for the driver since lower luminosity can reduce his ability to see what is happening on the road and therefore lead to a loss of reflexes. If it is desired to attenuate this loss of luminosity, for example, by increasing the number of light sources, the light module becomes bulky and cannot fit into the reduced space allocated to it in a lighting device integrated into the motor vehicle.

An object of the invention is to provide a light module overcoming the drawbacks of the prior art.

SUMMARY OF THE INVENTION

One subject of the invention is a light module of a motor vehicle lighting device, comprising a plurality of first light sources, at least one first collector comprising a reflective surface arranged to collect and reflect the light rays emitted by the light sources into a light beam and an optical projection system arranged to project said light beam; the optical system comprising a first portion arranged to form an image of the reflective surface of the collector. The light module is noteworthy in that it comprises a first diffusing screen interposed between said portion of the optical projection system and the collector.

The light module can for example participate in the implementation of a lighting function of the regulatory low-beam type. The optical system can be a lens, arranged at the front of the device, comprising several portions. The optical system can also be a reflector or a combination of one or more reflectors and one or more lenses. It is the projection system that allows the projection of the light beams emitted by the light sources onto the road. The light collector is arranged in line with the light sources, so as to collect the light beam produced by the light sources and to send it to the optical system, itself adapted to project the light beam onto the road. The collector is made in such a way that its shape is reproduced on the road the reflection of the light which is projected on it.

The first diffusing screen may have a front face, oriented toward the first portion of the optical projection system, and a rear face, oriented toward the collector of the second light module. The rear face is oriented toward the collector of the light module, it is this face which receives the light beams reflected by said collector of the light module. The front face of the first screen is oriented toward said optical system, that is to say that it is this face which projects the image of the collector onto the optical projection system. The front and rear faces of the first screen comprise a succession of concavities and convexities, respectively. Each of the front and rear faces is provided with a plurality of tori. The first screen can make it possible to produce a light beam having an inverted "T" shape. The inverted "T" shape can be formed by the horizontal diffusion of the light beam by the diffusing screen.

Thanks to the invention, it is thus possible to compensate for the loss of luminosity, due to the extinguishing of one of the light sources, at the level of the superposition of the image of the first collector projected onto the road from the rays capable of being emitted by this source and another light beam, using the images generated by the first collector from the rays emitted by the neighboring light sources and diffused by the first diffusing screen.

Advantageously, each first light source is selectively activatable, and the light module comprises a control unit arranged to selectively control each of the first light sources.

Preferably, each light source is composed of a selectively activatable light-emitting diode. In this example, the control unit is arranged to selectively activate one or more or all of each of the light sources, for example according to the instructions received from a computer included in the motor vehicle in which the light module is installed.

Advantageously, the first collector comprises a plurality of sectors, each sector being arranged to collect and reflect the light rays emitted by at least one of the first light sources with which it is associated, said first portion of the optical system being arranged to form an image of each sector. It is thus understood that each sector defines, on its own, a part of the light beam emitted by one of the modules.

The plurality of sectors of the collector can be arranged transversely relative to one another. The sectors have for example a truncated parabolic profile or, as a variant, a truncated elliptical profile. According to one example, a single light source is associated with each sector of the collector, that is to say that the light module comprises as many light sources as there are sectors in the collector. Where applicable, the light sources extend transversely with respect to an optical axis of the optical projection system. For example, in the collector, two adjacent sectors may have a common lateral edge.

Each sector of the collector has a rear edge and the first portion of the optical system has a focal point line situated in the vicinity of the rear edges of said sectors of the collector so that the image of each sector formed by this portion has an upper cutoff formed by the rear edge of this sector. In particular, focal point line situated in the vicinity of the rear edges of the sectors means a focal point line situated at a distance from said rear edges which is less than 10 mm.

Advantageously, each sector of the first collector has a rear edge, a front edge and two lateral edges, and wherein said first portion of the optical system has a focal point line situated in the vicinity of the rear edges of said sectors so that the image of each sector formed by this first portion has an upper cutoff formed by the rear edge of this sector and two lateral cutoffs each formed by at least a part of one of the lateral edges of this sector.

It is the shape of the collector that gives the shape of the beam projected onto the road. The fact that the collector has an upper cutoff which is formed by the rear edge of the sector makes it possible to give a precise cutoff line to the projected light beam. The upper cutoff and the lateral cutoffs make it possible to define a light beam adapted to the shape of the collector.

Advantageously, the first diffusing screen is arranged to horizontally diffuse only a lower part of the image of each sector of the first collector formed by the first portion of the optical system.

The diffusing screen allows the horizontal diffusion of the light beam by projecting the image of each sector, thus forming a projected image having the shape of an inverted "T". In one embodiment of the invention, the first diffusing screen is interposed between the portion of the optical projection system and the collector.

Advantageously, the first diffusing screen is arranged to intercept and deflect only light rays emitted by each first light source and reflected by an upper part of the sector of the first collector associated with this first light source.

For example, the first screen has an upper rim projecting from the rest of this screen toward the collector, the first screen being arranged so that this upper rim adjoins an upper edge of the collector. The rim may have a sinusoidal shape similar to the front and rear faces of the diffusing screen and may coincide with the upper front edge of the collector of the second light module.

Advantageously, the first diffusing screen is arranged to horizontally diffuse the entire image of each sector of the first collector formed by the first portion of the optical system.

The first diffusing screen can extend between an upper part of the first collector and the portion of the optical system which has a focal point line situated in the vicinity of the rear edges of said sectors of said collector.

If necessary, the first diffusing screen can be arranged to intercept and deflect only light rays emitted by each first light source and reflected by an upper part of the sector of the collector associated with this first light source.

Advantageously, the first screen has a rear face, oriented toward the first collector, and a front face, oriented toward the first portion of the optical projection system, and wherein the rear face and/or the front face are/is provided with diffusing patterns making it possible to blur the contours of the image of the collector projected onto the road.

The diffusing screen has a front face and a rear face, the two faces being of identical shape. The rear face is oriented toward the first collector, it being this face which receives the light beam reflected by said first collector. The front face of the screen is oriented toward said first portion of the optical system, that is to say that it is this face which projects the image of the collector onto the optical projection system. The front and rear faces of the diffusing screen comprise a succession of concavities and convexities, respectively. Each of the front and rear faces is provided with a plurality of tori.

Advantageously, the first screen has an upper rim projecting from the rest of this screen toward the first collector, the first screen being arranged so that this upper rim adjoins an upper edge of the first collector.

The rim may have a sinusoidal shape similar to the front and rear faces of the diffusing screen and may coincide with the upper front edge of the collector of the light module.

Advantageously, the first collector comprises at least one lateral fixing wing arranged at one end of its reflective surface, and wherein the first screen comprises at least one lateral fixing member arranged to cooperate with the lateral fixing wing of the first collector.

The lateral fixing wing of the collector of the module is, for example, a slot. The lateral fixing member of the first screen is, for example, a pin or a lug. The pin or the lug of the screen is inserted into the slot of the collector in order to maintain the first screen in position in front of the collector of the light module.

Advantageously, the light module comprises a support plate on which the first screen and the first collector are mounted.

The light sources, the first screen and the first collector are mounted on a common support, said support being a plate of a heat sink. The heat sink may comprise fins in the continuity of the plate.

Advantageously, the light module comprises a first diaphragm arranged between the first screen and the first portion of the optical projection device.

The first diaphragm is arranged perpendicular to the optical axis of the optical projection system.

Advantageously, the light module comprises a first submodule comprising said plurality of first light sources, the first collector, the first diffusing screen and said first portion of the optical projection system, and in that it comprises a second submodule comprising a plurality of second light sources, a second collector comprising a reflective surface arranged to collect and reflect the light rays emitted by the second light sources into a light beam, a second portion of the optical projection system arranged to form an image of the reflective surface of the second collector, a second diffusing screen interposed between said second portion of the optical projection system and the second collector.

The collector of the first submodule and the collector of the second submodule can comprise twelve sectors. For example, the first screen and the second screen extend over the whole length of the collector of the first submodule and of the collector of the second submodule.

Advantageously, the two submodules are adjacent on the same horizontal line. If necessary, the collector of the first submodule and the collector of the second submodule can in particular be arranged in the continuity of one another. The front and rear faces of the screen of the second module may have a sinusoidal profile. Specifically, the front face has a concavity at the level of the collectors of the first submodule and of the second submodule and has a convexity in line with the junction of the collector of the first submodule and the collector of the second submodule, that is to say at the level of the meeting of the first screen and the second screen.

Advantageously, the first collector and the second collector form a single part, in that the first screen and the second screen form a single part, and in that the optical projection system forms a single part.

Advantageously, the light module comprises a partition wall arranged between the first and second submodules.

The partition wall can be arranged parallel to the optical axis of the optical projection system. Alternatively or cumulatively, each submodule comprises a diaphragm arranged between the screen and the optical projection system. For example, the diaphragm of the first submodule and the diaphragm of the second submodule form a single part called the diaphragm. According to one example, the partition wall and the diaphragm can form a single part.

Advantageously, the first submodule is arranged so that the images of the sectors of the first collector formed by the first portion of the optical projection system are superimposed and/or interlaced with the images of the sectors of the second collector formed by the second portion of the optical projection system.

The space between two adjacent images formed by the first submodule is filled by an image formed by the second submodule, thus forming a projection of light beams making it possible to avoid the losses of luminosity.

Another subject of the invention is a lighting device of a motor vehicle, comprising a light module according to one of the preceding claims.

BRIEF DESCRIPTION OF DRAWINGS

Other advantages and features of the present invention are now described with the aid of examples, which are purely illustrative and in no way limit the scope of the invention, and on the basis of the appended drawings, in which drawings the various figures represent the following.

DETAILED DESCRIPTION OF THE INVENTION

Throughout the following description, elements that are identical in terms of structure or in terms of function and that appear in various figures have been designated with the same reference sign, unless otherwise indicated.

Figure 1:
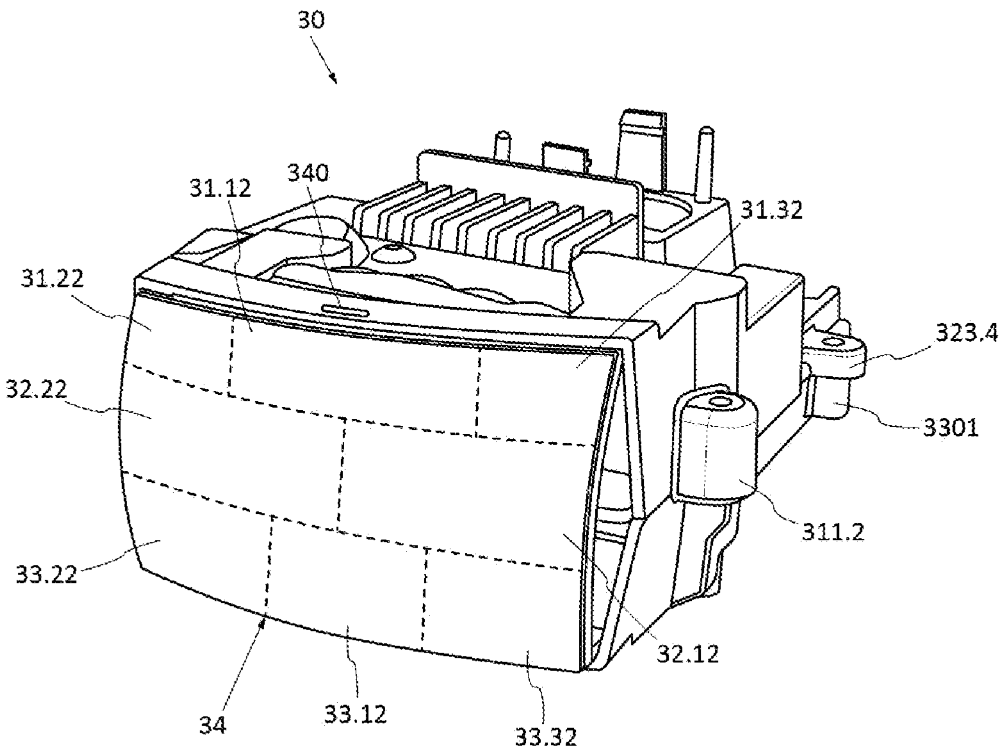
FIG. 1 represents, schematically and partially, a front perspective view of a lighting device according to one embodiment of the invention.

FIG. 1 represents a lighting device 30 of a vehicle. This lighting device 30 will be described in conjunction with FIGS. 2-7, which each represent a view of a part of this lighting device 30, and in conjunction with FIGS. 8-10, which each represent an example of a light beam capable of being emitted by this lighting device 30.

The lighting device 30 comprises three light modules 31, 32, 33 and has on its front face an optical projection lens 34. The lens 34 is formed from a single part common to the plurality of light modules 31, 32, 33 allowing the light beams emitted by the plurality of light sources to be projected onto the road.

Figure 2:
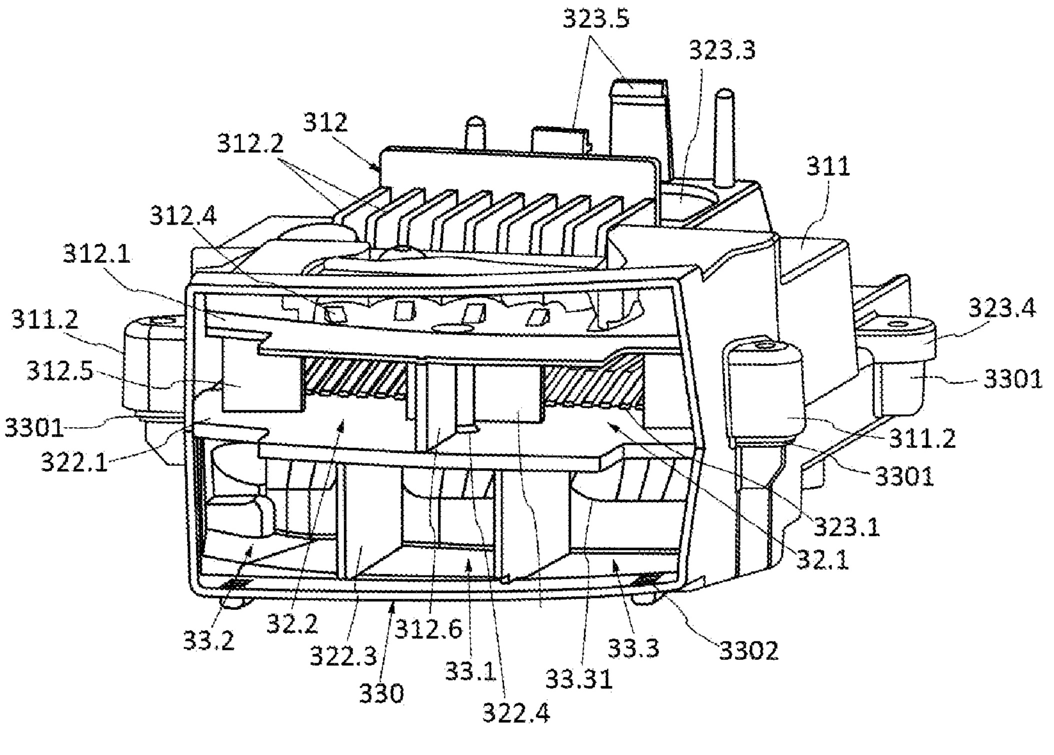
FIG. 2 represents, schematically and partially, another front perspective view of the lighting device of FIG. 1, in which the optical projection system has been removed.

As shown in FIG. 2, the first light module 31 is positioned above the second light module 32, itself being positioned above the third light module 33. The first light module 31 comprises a first submodule 31.1, called the central submodule, and a second and a third submodule 31.2 and 31.3, called the lateral submodules, aligned horizontally, so as to be adjacent to one another. The second light module 32, according to one embodiment of the invention, comprises a first submodule 32.1 and a second submodule 32.2, aligned horizontally, so as to be adjacent to one another. The third light module 33 comprises a first submodule 33.1, called the central submodule, a second submodule 33.2 and a third submodule 33.3, called the lateral submodules, aligned horizontally, so as to be adjacent to one another. In each of the light modules 31, 32, 33, two adjacent submodules have a common lateral edge.

Each of the light submodules 31.1, 31.2 and 31.3 comprises at least one light source (not shown in the figures), a collector 31.11, 31.21 and 31.31, respectively, comprising a reflective surface arranged to collect and reflect the light rays emitted by said at least one light source into a light beam.

Figure 3:
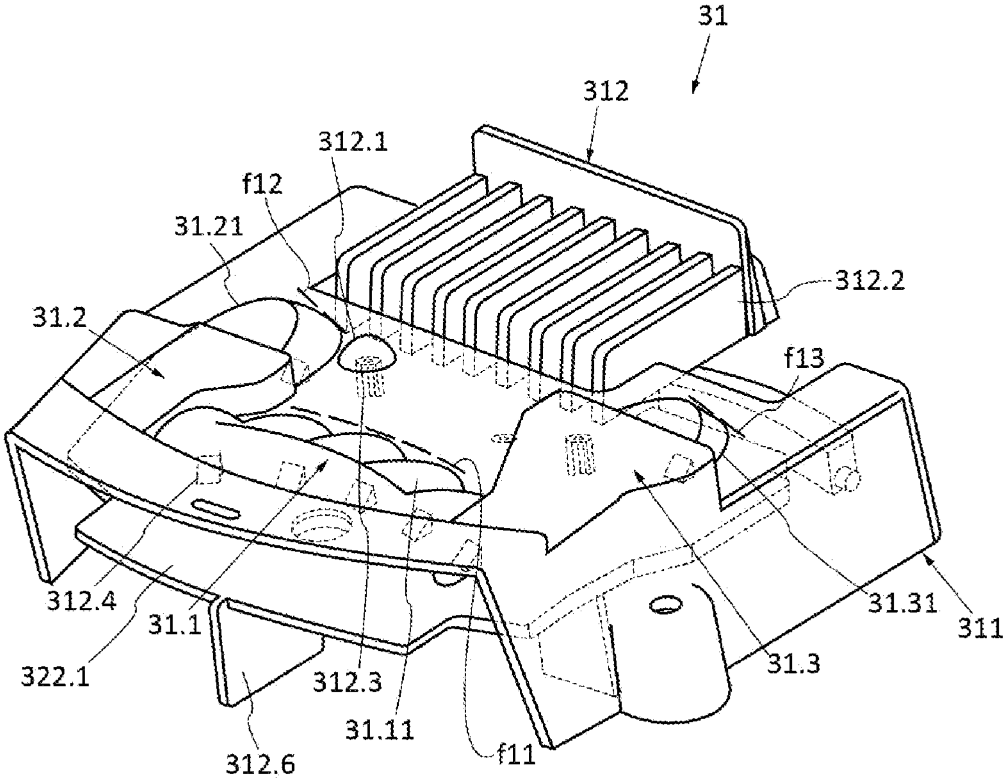
FIG. 3 represents, schematically and partially, a top perspective view of a first light module of the lighting device of FIG. 1.

As shown in FIG. 3, the collector 31.11 is divided into five sectors, and the light submodule 31.1 comprises five light sources, each associated with one of these sectors. In the collector 31.11, two adjacent sectors have a common lateral edge. In the example described, the plurality of sectors of the collector 31.11 are arranged transversely with respect to one another. The sectors have a truncated parabolic profile each defining a cavity in which the light source is arranged.

The collectors 31.21 and 31.31 each comprise a single sector, and the submodules 31.2 and 31.3 each comprise a single light source (not shown) associated with the collector 31.21 and 31.31, respectively.

Each sector of the collectors 31.11, 31.21 and 31.31 is arranged so that it collects the light beam emitted by the light source and to reflect it toward the optical system 34. More precisely, each collector 31.11, 31.21 and 31.31 of a light submodule 31.1, 31.2 and 31.3 reflects this light beam toward a portion of the optical system 34, respectively 31.12, 31.22 and 31.32, considered to be part of said light submodule 31.1, 31.2 and 31.3. This lens portion 31.12, 31.22 and 31.32 has a focal point line, respectively f11, f12 and 13, passing through the rear edge of the collector 31.11, 31.21 and 31.31, so that this lens portion projects the image of this collector onto the road.

Figure 8:
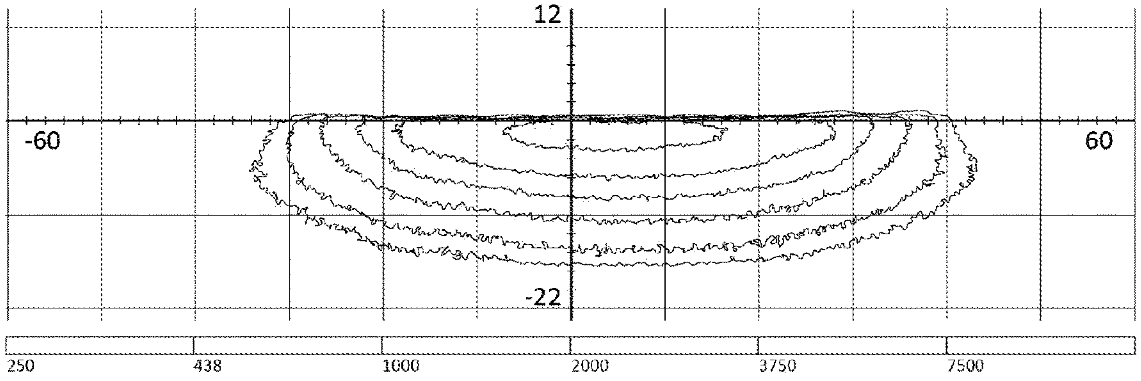
FIG. 8 represents, in projection on a vertical screen, an example of a light beam emitted by the first light module of the lighting device of FIG. 1.

In the example described, the first central submodule 31.1 is thus arranged to form a light beam having a substantially flat upper cutoff, shown in FIG. 8. Each of the second and third lateral submodules 31.2 and 31.3 is arranged to form a light beam also having a substantially flat upper cutoff and having a horizontal extent and a maximum light intensity which are less than those of the beam capable of being emitted by the first central submodule 31.1. These two beams are for example intended to supplement the beam capable of being emitted by the first central submodule 31.1 for the performance of functions of the motorway lighting or wide-range lighting type.

The collector 31.11 is arranged between the collectors 31.21 and 31.31. The collectors 31.11, 31.21 and 31.31 are formed by the same first part 311, forming a cover of the lighting device 30, as shown in FIG. 1.

The first light module 31 comprises a first heat sink 312. The first heat sink 312 comprises a plate 312.1 serving as a common support for the plurality of light sources of the first light module 31 and comprises a plurality of heat dissipation fins 312.2. The first heat sink 312 comprises, on its upper face, pins 312.3 intended to come into abutment in recesses 311.1 of the cover 311 and allowing the indexing of the collectors 31.11, 31.21 and 31.31 with respect to the light sources.

The plate 312.1 comprises a plurality of blocking members 312.4, each having the shape of a triangular prism arranged in line with each of the light sources of the first module 31. The blocking members 312.4 are preferably shields making it possible to prevent direct, so-called parasitic, light from the light sources from passing through the optical system 34.

The rear part of the cover 311, opposite to the fixing region of the optical system 34, has a recess, shown in FIG. 3, in which the fins 312.2 of the first heat sink 312 are arranged.

Each of the light submodules 32.1 and 32.2 comprises at least one light source (not shown in the figures), a collector 32.11 and 32.21, respectively, comprising a reflective surface arranged to collect and reflect the light rays emitted by said at least one light source into a light beam and a first and a second diffusing screen 321.1, 321.2 interposed between said collector 32.11 and 32.21 and the optical projection system 34.

The collectors 32.11 and 32.21 are divided into twelve sectors. The light submodules 32.1, 32.2 comprise twelve light sources (not shown), each associated with one of these sectors. In the collectors 32.11 and 32.21, two adjacent sectors have a common lateral edge. In the example described, the plurality of sectors of the collectors 32.11 and 32.21 are arranged transversely with respect to one another. The sectors have a truncated parabolic profile each defining a cavity in which the light source is arranged. Each sector of the collectors 32.11 and 32.21 is arranged so as to collect the light beam emitted by the plurality of light sources and to reflect said beam toward the optical system 34. More precisely, each collector 32.11 and 32.21 of the light submodules 32.1 and 32.2 reflects this light beam toward a portion of the optical system 34, respectively 32.12 and 32.22, considered to be part of said light submodule 32.1 and 32.2. This lens portion 32.12 and 32.22 has a focal point line, respectively f21 and f22, passing through the rear edge of the collectors 32.11 and 32.21, so that this lens portion projects the image of these collectors onto the road.

Figure 4:
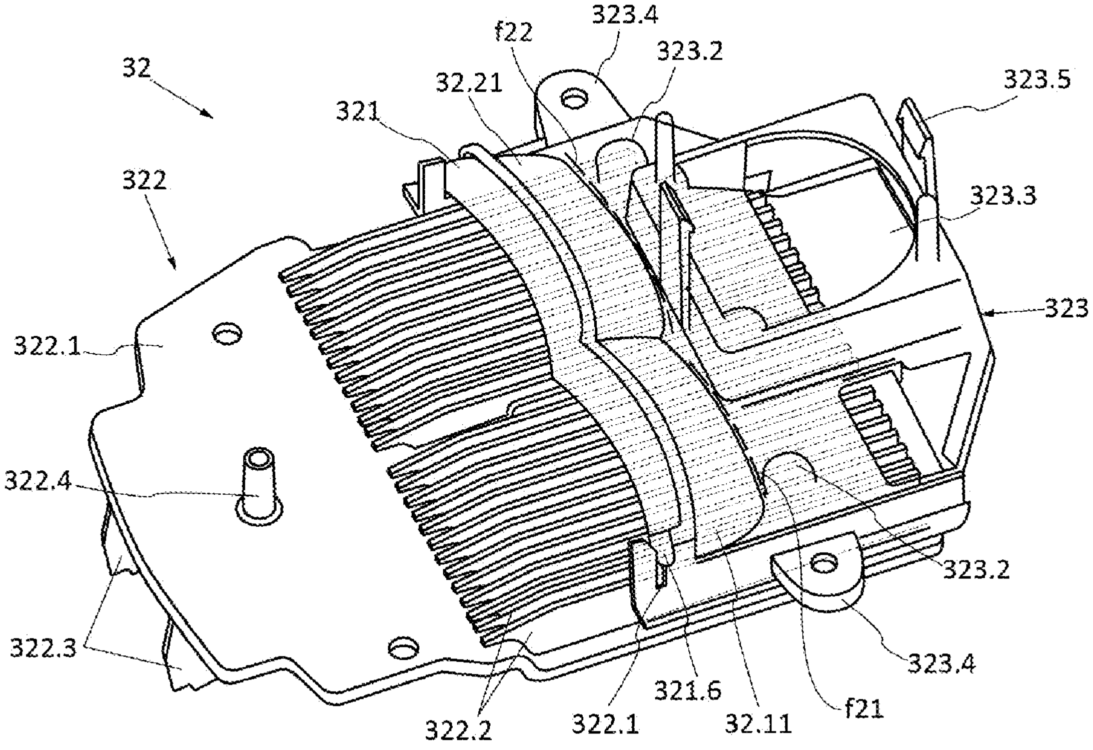
FIG. 4 represents, schematically and partially, a top perspective view of a second light module of the lighting device of FIG. 1.

The collectors 32.11 and 32.21 are in continuity with one another and form a second single part 323, as shown in FIG. 4.

The first diffusing screen 321.1 and the second diffusing screen 321.2 are arranged respectively in line with the collectors 32.11 and 32.21. The first and the second screen 321.1 and 321.2 form one and the same part called screen 321. The first and the second screen 321.1 and 321.2 have a front face 321.3, oriented toward the first and the second portion of the optical projection system 34, and a rear face 321.4, oriented toward the collectors 32.11 and 32.21. Since the rear face 321.4 of the screen 321 is oriented toward the collectors 32.11 and 32.21, it is this face 321.4 which receives the light beams reflected by said collectors 32.11 and 32.21. The front face 321.3 of the screen 321 is oriented toward said optical system 34, that is to say that it is this face 321.3 which projects the image of the collectors 32.11 and 32.21 onto the optical projection system 34. The front 321.3 and rear 321.4 faces comprise a succession of concavities and convexities, respectively. Each of the front 321.3 and rear 321.4 faces is provided with a plurality of tori. The screen 321 has an upper rim 321.5, projecting from the rest of said screen 321 toward the collectors 32.11 and 32.21, the screen 321 being arranged so that said rim 321.5 adjoins the upper edge of the collectors 32.11 and 32.21. The rim 321.5 has a sinusoidal shape similar to the front 321.3 and rear 321.4 faces and coincides with the upper front edge of each collector 32.11 and 32.21.

The second single part 323 comprises at least one lateral fixing wing 323.1 arranged at one end of its reflective surface, and the screen 321 comprises at least one lateral fixing member 321.6 arranged to cooperate with said lateral fixing wing 323.1 of the second single part 323. The lateral fixing wing 323.1 is a slot. The lateral fixing member 321.6 is a pin or a lug. The pin or lug 321.6 is inserted into the slot 323.1 in order to maintain the screen 321 in position in front of the collector 32.11 and 32.21.

Figure 9:
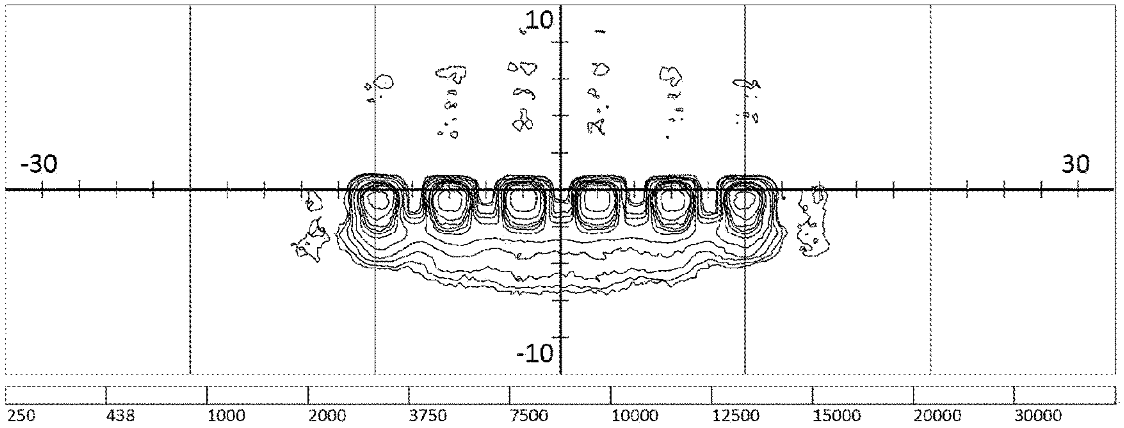
FIG. 9 represents, in projection on a vertical screen, an example of a light beam emitted by the second light module of the lighting device of FIG. 1.

In the example described, the first and the second submodules 32.1 and 32.2 are thus arranged to form a plurality of light segments each having a shape substantially in the shape of an inverted "T" having a horizontal extent. The screen 321 allows the horizontal diffusion of each light segment formed from the image of each sector, at the level of its lower part, so as to obtain light segments having this said particular inverted "T" shape. When all of the light sources of one of these submodules 32.1 and 32.2 are activated, the diffused lower portions of these light segments formed by this submodule are superimposed to form a segmented light beam. FIG. 9 represents a segmented light beam emitted by only one of these submodules, for example the submodule 32.1, when only 6 of the 12 light sources are activated.

The first submodule 32.1 is arranged so that the images of the sectors of the first collector 32.11 formed by a first portion of the optical projection system 32.12 are superimposed with the images of the sectors of the second collector 32.21 of the second submodule 32.2 formed by a second portion 32.22 of the optical projection system 34. For example, each image formed by the second submodule 32.2 is superimposed with at least one of the images formed by the first submodule 32.1, the set of images thus forming together a homogeneous light beam.

The second light module 32 comprises a second heat sink 322. Said second heat sink 322 comprises a plate 322.1 serving as a common support for the plurality of light sources of the second light module 32 and comprises a plurality of heat dissipation fins 322.2. The second heat sink 322 comprises, on its upper face, pins 322.4 intended to come into abutment in recesses 323.2 of the second single part 323 and allowing the indexing of the collectors 32.11 and 32.21 with respect to the light sources.

The lower face of the second heat sink 322, opposite to the face comprising the plurality of light sources, comprises a plurality of partition walls 322.3 forming a lateral edge common to two adjacent submodules of the third light module 33.

The second single part 323 comprises a sloping opening 323.3 opening out onto the fins 322.2 of the second heat sink 322, as shown in FIG. 4. The second single part 323 comprises fixing members 323.5 arranged in line with said opening 323.3, intended to cooperate with a fan (not shown). The sloping opening makes it possible to direct the air flow toward the fan and thus improve heat dissipation. The opening 323.3 allows the dissipation of the heat produced by the light sources of the second module 32.

The lower face of the first heat sink 312, opposite to the face comprising the plurality of light sources of the first module 31, comprises a diaphragm 312.5 arranged perpendicularly with respect to the optical axis of the optical projection system 34 and comprises a partition wall 312.6 of the first and second submodules of the second light module 32, as shown in FIG. 1 and in FIG. 3. The first heat sink 312, the partition wall 322.3 and the diaphragm 312.5 form a single part.

Each of the light submodules 33.1, 33.2 and 33.3 of the third module 33 comprises at least one light source (not shown in the figures), a collector 33.11, 33.21 and 33.31, respectively, comprising a reflective surface arranged to collect and reflect the light rays emitted by said at least one light source into a light beam.

Figure 5:
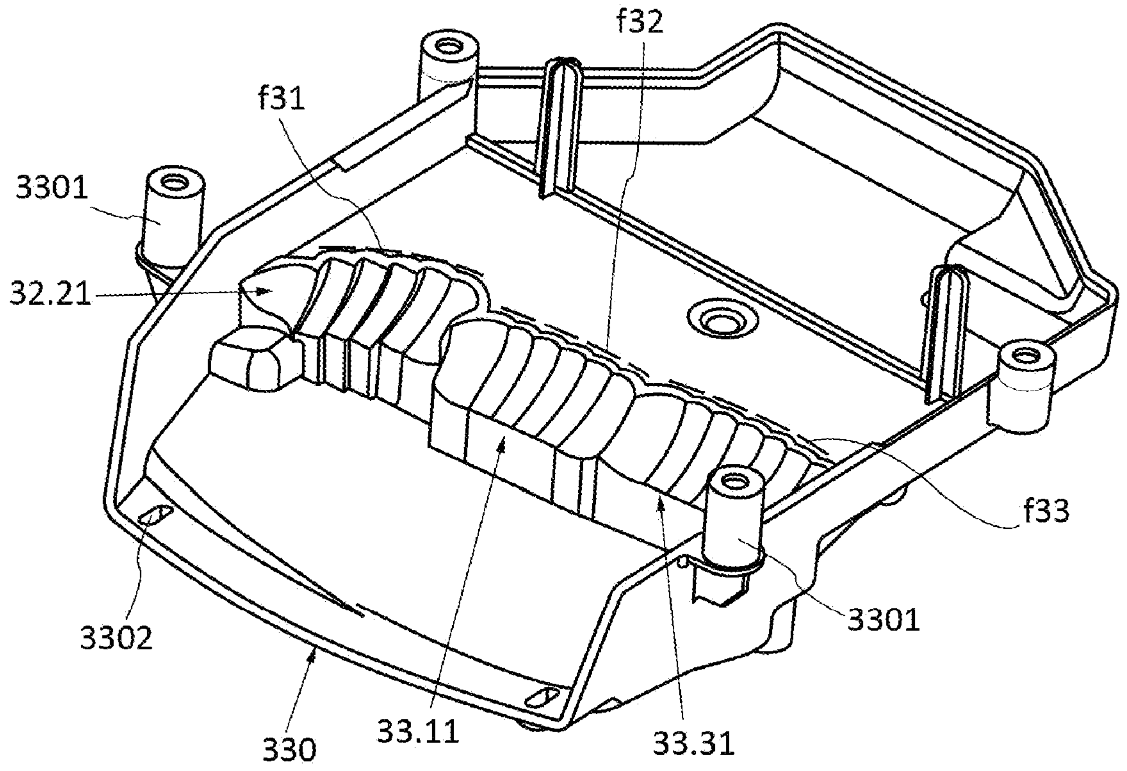
FIG. 5 represents, schematically and partially, a top perspective view of a third light module of the lighting device of FIG. 1.
Figure 6:
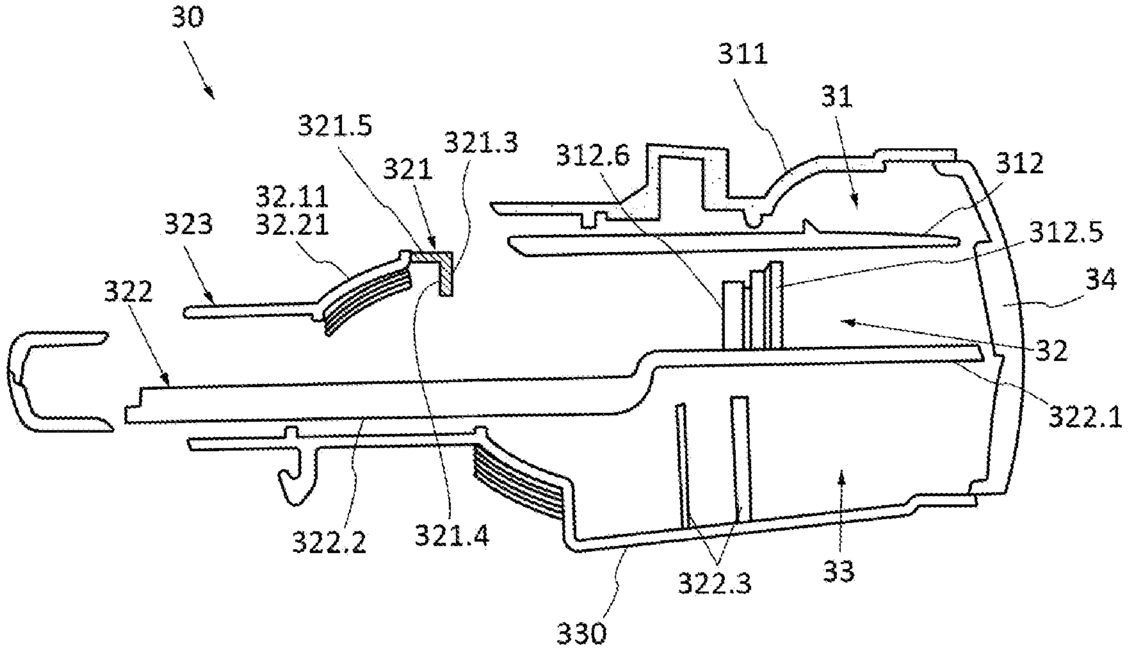
FIG. 6 represents, schematically and partially, a cross-sectional view of the lighting device of FIG. 1.
Figure 7:
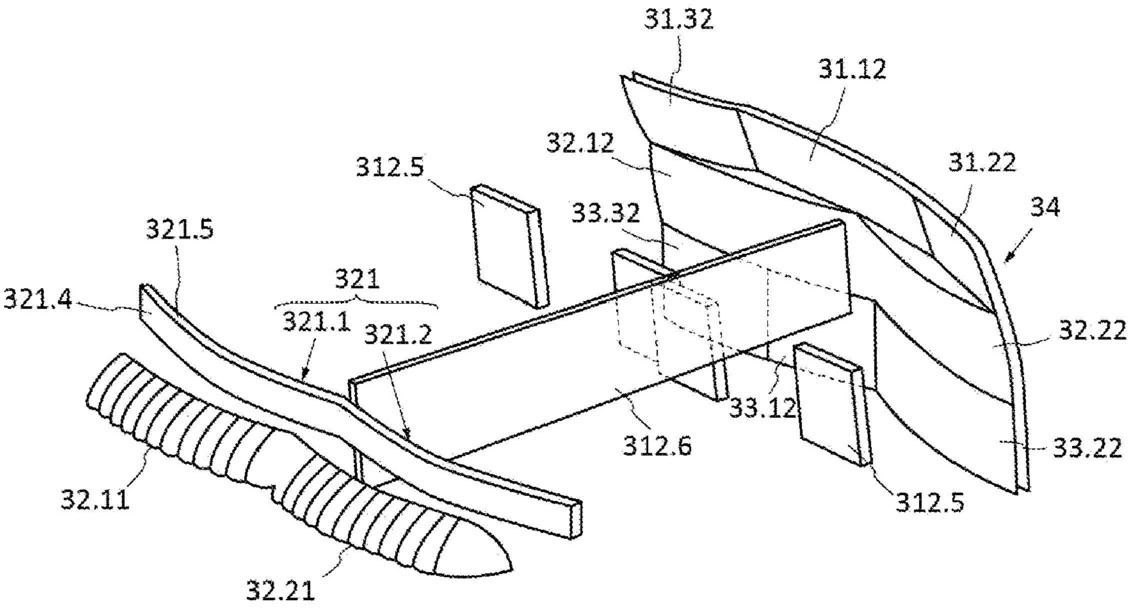
FIG. 7 represents, schematically and partially, a rear perspective view of the second light module of the lighting device of FIG. 1.

As shown in FIG. 5, the central collector 33.11 is divided into six sectors, and the light submodule 33.1 comprises six light sources, each associated with one of these sectors. In the collector 33.11, two adjacent sectors have a common lateral edge. In the example described, the plurality of sectors of the collector 33.11 are arranged transversely with respect to one another. The sectors have a truncated parabolic profile each defining a cavity in which the light source is arranged.

The collectors 33.21 and 33.31 respectively comprise six and eight sectors, and the submodules 33.2 and 33.3 respectively comprise six and eight light sources (not shown) associated with the collector 33.21 and 33.31, respectively.

Each sector of the collectors 33.11, 33.21 and 33.31 is arranged so that it collects the light beam emitted by the light source and to reflect it toward the optical system 34. More precisely, each collector 33.11, 33.21 and 33.31 of a light submodule 33.1, 33.2 and 33.3 reflects this light beam toward a portion of the optical system 34, respectively 33.12, 33.22 and 33.32, considered to be part of said light submodule 33.1, 33.2 and 33.3. This lens portion 33.12, 33.22 and 33.32 has a focal point line, respectively f31, f32 and 33, passing through the rear edge of the collector 33.11, 33.21 and 33.31, so that this lens portion projects the image of this collector onto the road.

Figure 10:
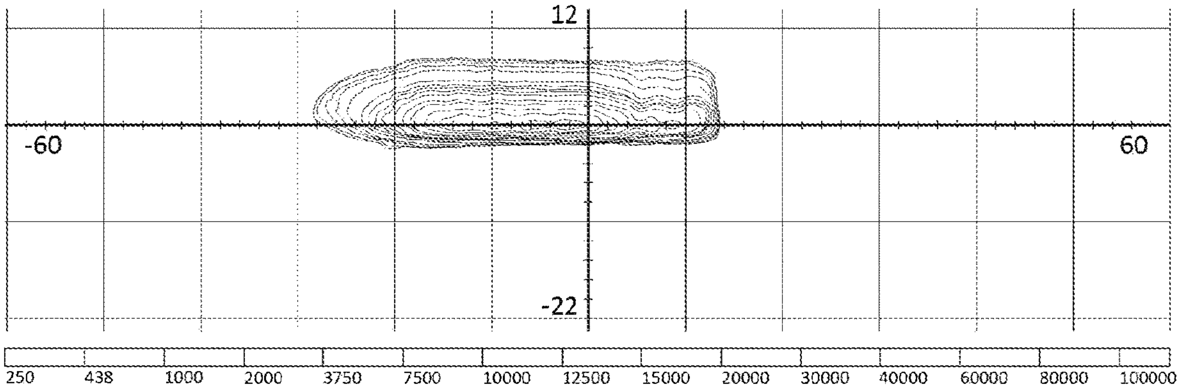
FIG. 10 represents, in projection on a vertical screen, an example of a light beam emitted by the third light module of the lighting device of FIG. 1.

In the example described, each of the first, second and third submodules 33.1, 33.2 and 33.3 is thus arranged to form a segmented light beam, each segment of which is selectively controllable, as shown in FIG. 10.

The collector 33.11 is arranged between the collectors 33.21 and 33.31. The collectors 33.11, 33.21 and 33.31 are formed by the same third part 330, forming a frame of the lighting device 30, as shown in FIG. 1 and in FIG. 5.

In the third module 33, two adjacent submodules have a common lateral edge 322.3, said lateral edge 322.3 forming a single part with the second heat sink 323 as shown in FIG. 5.

The cavity or cavities of the collector 31.11, 31.21 and 31.31 and the cavities of the collector 33.11, 33.21 and 33.31 are oriented in opposite directions and the cavity or cavities of the collector 31.11, 31.21 and 31.31 and the cavities of the collector 32.11 and 32.21 are oriented in identical directions.

The light sources of the second light module 32 are mounted on a first face of the second common support 322.1 and in that the light sources of the third light module 33 are mounted on a second face, opposite to the first face, of the second common support 322.1.

The second single part 323 comprises two recesses 323.2 in which a pin 330.1 of the frame 330 is housed to hold together said second single part 323 and said frame 330.

The cover 311 and the frame 330 each comprise second fixing members 311.2, 330.1, respectively caps 311.2 and pins 330.1, as shown in FIG. 2. Said caps 311.2 and said pins 330.1 cooperate together to hold together said cover 311 and said frame 330. The second single part 323 and the frame 330 each comprise first fixing members 323.4, 330.1, respectively caps 323.4 and pins 330.1, as shown in FIG. 2. Said caps 323.4 and said pins 330.1 cooperate together to hold together said second single part 323 and said frame 330.

The front part of the cover 311 has a slot 3111 for fixing the optical system 34. The frame 330 comprises a slot 330.2 capable of cooperating with the cutout 340 of the optical system 34. The lens comprises at least one cutout 340 cooperating with at least the slot 3111 of the housing.

The device therefore comprises the first light module 31 arranged to emit the first light beam with flat cutoff, the second light module 32 arranged to emit the second light beam extending at least partially above the first light beam, and the third light module 33 arranged to emit the segmented light beam, each segment of which is selectively controllable, the third light beam extending at least partially above the second light beam.

The above description clearly explains how the invention makes it possible to achieve the objectives it has set itself, namely to use a device making it possible to compensate for the losses of luminosity due to the extinguishing of one of the light sources, by proposing a light module of a motor vehicle lighting device comprising a diffusing screen.

In any event, the invention should not be regarded as being limited to the embodiments specifically described in this document, and extends, in particular, to any equivalent means and to any technically operative combination of these means.

What is claimed is:

1. A light module of a motor vehicle lighting device, comprising: a plurality of first light sources; at least one first collector including a reflective surface arranged to collect and reflect light rays emitted by the plurality of first light sources into a light beam; an optical projection system arranged to project the light beam; the optical projection system including a first portion arranged to form an image of the reflective surface of the first collector; and a first diffusing screen interposed between the first portion of the optical projection system and the first collector, with the first diffusing screen arranged to horizontally diffuse only a lower part of the image.

2. The light module as claimed in claim 1, wherein
the first collector includes a plurality of sectors, each sector being arranged to collect and reflect the light rays emitted by at least one of the plurality of first light sources with which it is associated, the first portion of the optical projection system being arranged to form an image of each sector.

3. The light module as claimed in claim 2, wherein
each sector of the first collector has a rear edge, a front edge and two lateral edges, and the first portion of the optical system has a focal point line situated in the vicinity of the rear edges of the sectors so that the image of each sector formed by the first portion of the optical projection system has an upper cutoff formed by the rear edge of a respective sector and two lateral cutoffs each formed by at least a part of the one of the lateral edges of the respective sector.

4. The light module as claimed in claim 2, wherein
the first diffusing screen is arranged to horizontally diffuse only a lower part of the image of each sector of the first collector formed by the first portion of the optical projection system.

5. The light module as claimed in claim 1, wherein the first diffusing screen has a rear face, oriented toward the first collector, and a front face, oriented toward the first portion of the optical projection system, and wherein the rear face or the front face include diffusing patterns.

6. The light module as claimed in claim 1, wherein
the first diffusing screen has an upper rim projecting from the rest of the first diffusing screen toward the first collector, the first diffusing screen being arranged so that the upper rim adjoins an upper edge of the first collector.

7. The light module as claimed in claim 1, wherein the first collector includes at least one lateral fixing wing arranged at one end of its reflective surface, and the first diffusing screen includes at least one lateral fixing member arranged to cooperate with the lateral fixing wing of the first collector.

8. The light module as claimed in claim 1, further comprising a first diaphragm arranged between the first diffusing screen and the first portion of the optical projection system.

9. The light module as claimed in claim 1, further comprising a first submodule including the plurality of first light sources, the first collector, the first diffusing screen and the first portion of the optical projection system, and a second submodule including:
a plurality of second light sources,
a second collector comprising a reflective surface arranged to collect and reflect the light rays emitted by the second light sources into a light beam;
a second portion of the optical projection system arranged to form an image of the reflective surface of the second collector;
a second diffusing screen interposed between the second portion of the optical projection system and the second collector.

10. The light module as claimed in claim 9, wherein
the first collector and the second collector form a single part, wherein the first diffusing screen and the second diffusing screen form a single part, wherein the first portion and the second portion of the optical projection system forms a single part.

11. The light module as claimed in claim 1, wherein the first diffusing screen has a rear face, oriented toward the first collector, and a front face, oriented toward the first portion of the optical projection system, and wherein the rear face and the front face include diffusing patterns.

12. A lighting device of a motor vehicle, comprising a light module that includes: a plurality of first light sources; at least one first collector including a reflective surface arranged to collect and reflect light rays emitted by the plurality of first light sources into a light beam; an optical projection system arranged to project the light beam; the optical projection system including a first portion arranged to form an image of the first reflective surface of the collector; and a first diffusing screen interposed between the portion of the optical projection system and the collector, with the first diffusing screen arranged to horizontally diffuse only a lower part of the image.

13. The lighting device as claimed in claim 12, further comprising at least one other light module arranged to project another light beam having a flat upper cutoff, wherein the other light module is arranged so that the light beam projected by the optical projection system extends at least partially above the another light beam.

* * * * *